United States Patent [19]

Runde

[11] Patent Number: 4,757,724
[45] Date of Patent: Jul. 19, 1988

[54] ROTARY SPEED REDUCER

[76] Inventor: Kenneth R. Runde, P.O. Box 307, Tavernier, Fla. 33070

[21] Appl. No.: 664,170

[22] Filed: Oct. 24, 1985

[51] Int. Cl.$^4$ .................. F16H 29/04; F16H 21/20; F16C 3/28
[52] U.S. Cl. ............................................ 74/117; 74/600
[58] Field of Search .......................... 74/117, 600, 601

[56] References Cited

U.S. PATENT DOCUMENTS

| | | | |
|---|---|---|---|
| 637,297 | 11/1899 | Strong | 74/600 |
| 1,349,328 | 8/1920 | De Martino | 74/117 |
| 2,062,241 | 11/1936 | Viberg | 74/600 |
| 2,319,485 | 5/1943 | Alabrune | 74/600 |
| 2,853,255 | 9/1958 | Rasmussen et al. | 74/600 |
| 3,073,173 | 1/1963 | Immel | 74/601 |

FOREIGN PATENT DOCUMENTS

| | | | |
|---|---|---|---|
| 822642 | 11/1951 | Fed. Rep. of Germany | 74/117 |
| 576821 | 5/1924 | France | 74/117 |
| 128946 | 8/1950 | Sweden | 74/600 |
| 641578 | 8/1950 | United Kingdom | 74/117 |

*Primary Examiner*—Lawrence J. Staab
*Attorney, Agent, or Firm*—John Cyril Malloy

[57] ABSTRACT

A rotary speed reducer, having the capability of infinitely variable output speed in the range from infinity to one, to two to one. Hydraulic pressure controls the output ratio, while the speed reducer is in operation. This mechanism operates by converting rotary motion from a motor to controlled reciprocating motion, which is converted to controlled rotary output motion.

This operating principle is adaptable for use in a continuously variable automobile transmission.

6 Claims, 6 Drawing Sheets

4,757,724

ROTARY SPEED REDUCER

SUMMARY OF THE INVENTION

This invention covers a mechanism for converting the rotation of an input shaft to infinitely variable rotation of the output shaft, and control of same during operation of the mechanism.

An object of the invention is to produce a rotary speed reducer that can be controlled remotely, namely either starting or stopping the output shaft, or changing the input to output ratio during operation of the speed reducer.

Another object of the invention is to produce an automatic automobile transmission of the infinitely variable ratio type using the basic mechanisms of the above mentioned speed reducer. The additional mechanisms needed includes two output shafts with means to shift each output shaft simultaneously from neutal to forward, and from neutral to reverse.

Another object of the invention is to produce a simple mechanism having few and readily manufactured parts.

DETAILED DESCRIPTION OF THE INVENTION

Figure 1:
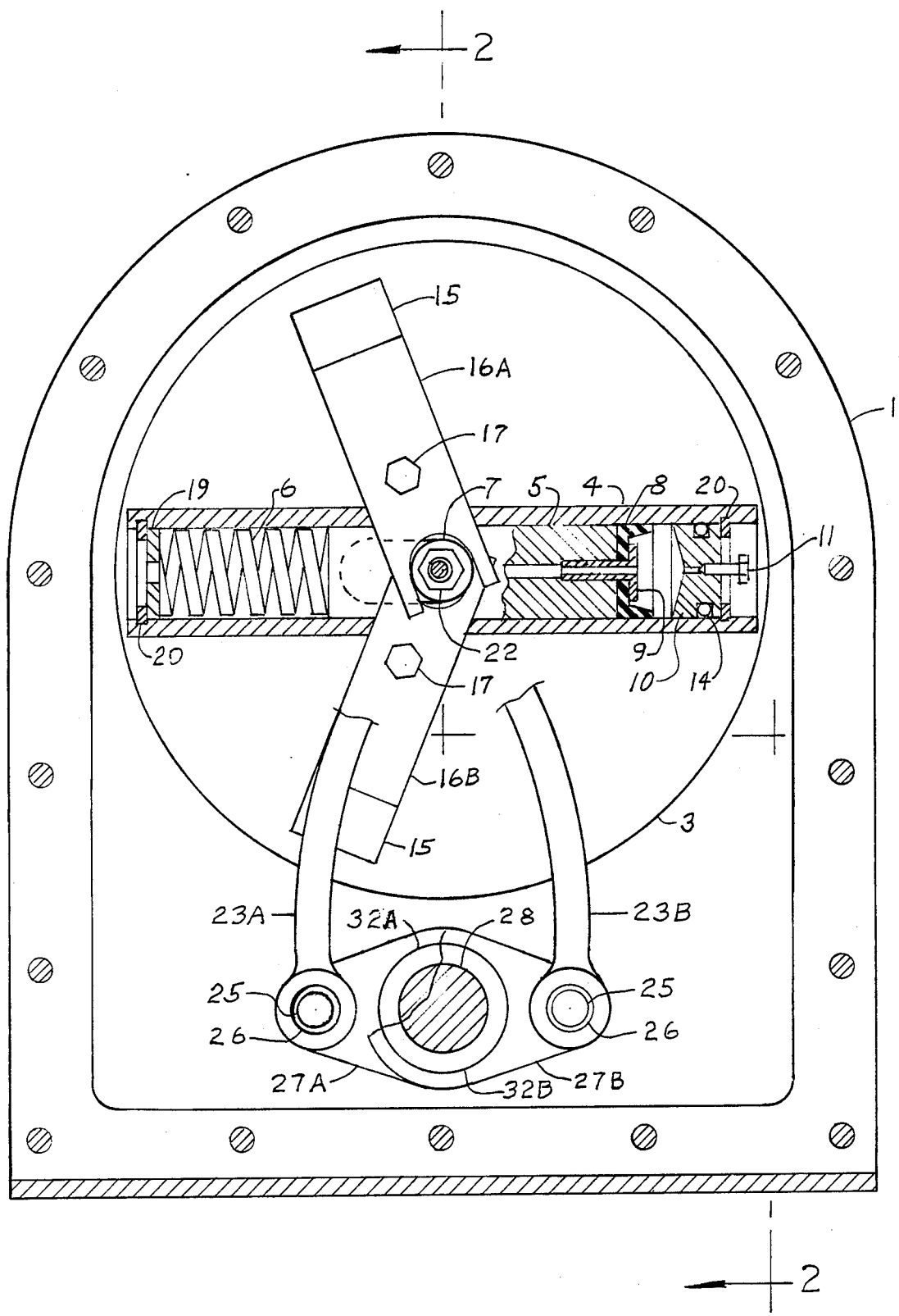
FIG. 1 is a front view of the speed reducer with housing cover 2 removed, generally taken along the line and direction of the arrows 1—1 of FIG. 2 with cross sections of the output shaft and hydraulic control mechanism.
Figure 2:
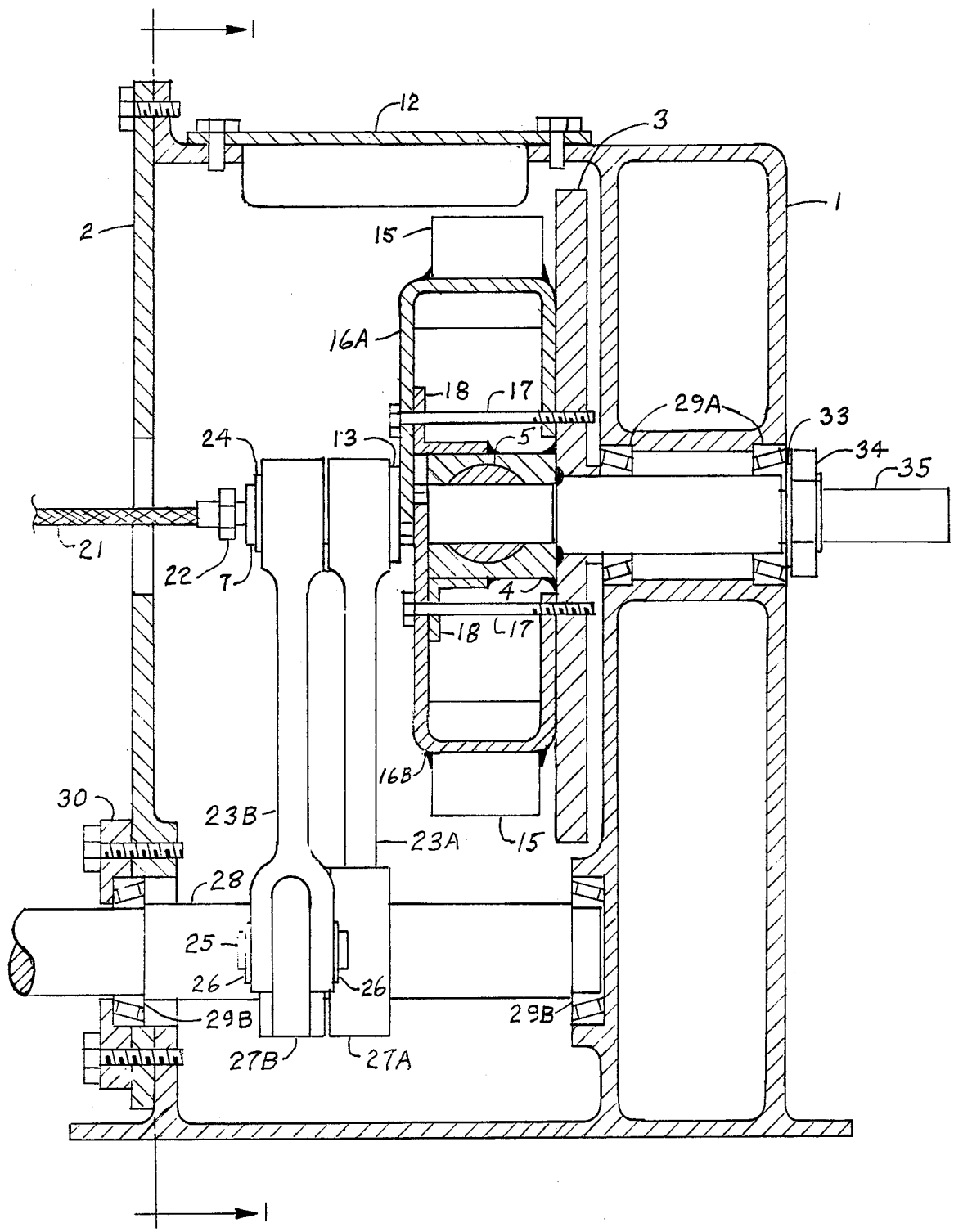
FIG. 2 is a cross sectional view taken generally along line 2—2 of FIG.1.

FIG. 1 and 2 illustrate the method of converting rotary input motion to infinately variable reciprocating motion, which is then converted to infinitely variable rotary output motion, while the mechanism is in operation.

FIG. 1 shows a front elevation of housing 1, with a pair of connecting rods 23A and 23B mounted side by side on crank pin 7. Spacer 13 separates counter balance lever 16A from connecting rod 23A. Retaining ring 24 prevents connecting rods 23B and 23A from sliding sideways. The lower ends of these connecting rods are connected to the outer ends of rocker arm assemblies 27A and 27B, located on opposite sides of output shaft 28, with pins 25 and retaining rings 26. Rocker arm assembly 27A includes of an over running clutch 32A, machined for press fitting at inner as well as outer ring, press fitted into bore of rocker arm 27A, and onto output shaft 28 to the location shown in FIG. 2. Similarly over running clutch 32B is press fitted into bore of rocker arm 27B, and onto output shaft 28 to the location shown in FIG. 2.

FIG. 1 shows crank pin 7 against the right end of the through slots in cylinder 4, as indicated by the dotted outline of the slots. This is the neutral position of crank pin 7, namely in line with the axis of rotation of the mounting disc 3. Thus, when the mounting disc 3 rotates, no motion is imparted to the connecting rods, and the output shaft 28 remains stationary. FIG. 2 shows input shaft 35 press fitted into mounting disc 3 and secured by welding.

Prior to welding cylinder 4 to mounting disc 3, piston 5 is inserted into cylinder 4, with cross hole lined up with slots through cylinder wall, to receive crank pin 7, for a press fit through piston 5. Die spring 6, spring support washer 19, and retaining ring 20 are next assembled. Die spring 6 is designed for a substantial preload against the piston to keep crank pin 7 solidly against the right end of the slots. Then cylinder 4 is securely welded to mounting disc 3, with crank pin 7 precisely in line with the axis of rotation of in put shaft 35.

The rest of the parts installed in cylinder 4 are shown in FIG. 1, namely hydraulic cup seal 8, seal retainer 9, fluid seal plug 10, synthetic rubber "O" ring 14, and air bleed screw 11.

Piston 5 has a drilled hole from the right end to the center of crank pin 7, which has a similar hole drilled from the outside end of same to meet the hole in piston 5. The outside end of crank pin 7 is machined to receive hydraulic hose fitting 22. Hydraulic hose 21 is secured to the other end of same.

When hydraulic fluid is pumped into hydraulic hose 21, it flows through fitting 22, then through holes mentioned above, and fills the space between piston cup seal, and seal plug 10. As pressure is increased piston 5 is forced to the left, compressing spring 6. Crank pin 7 moves with piston 5, and when the mounting disc 3 is rotated, crank pin 7 moves in a circle around the center of the mounting disc 3. As the hydraulic pressure is increased, the circular path is increased proportionately. This imparts a reciprocating motion to both connecting rods 23A and 23B, which in turn rotates rocker arms 27A and 27B up and down.

Assuming clockwise rotation of the output shaft is desired, overrunning clutch 32A in rocker arm assembly 27A would have to grip output shaft 28, when connecting rod 23A is moving upwardly. At the same time, connecting rod 23B is moving up also, turning rocker arm assembly 27B, and over running clutch 32B, in a counter clockwise direction. This clutch must over run when turned counter clockwise. After the connecting rods have reached the top of their travel, and are moving down, connecting rod 23B turns rocker arm 27B clockwise, which grips output shaft 28, and turns it clockwise. Connecting rod 23A turns rocker arm 27A counter clockwise, but since it over runs in the counter clockwise direction, it does not impede the desired clockwise rotation of the output shaft. Thus the output shaft 28 is continuously turned clockwise.

When piston 5 moves to the left under increase in hydraulic pressure, the mass of the piston 5, crank pin 7, and spring 6 unbalances the rotating assembly. To compensate for this, the movement of crank pin 7 is used to shift both counter weights 15 to the right by engaging forked ends of counter balance levers 16A and 16B that pivot on counter balance pins 17. FIG. 2 shows pivot angles 18 welded to top and bottom surfaces of cylinder 4. Pivot pins 17 have threaded ends, and are screwed into tapped holes in mounting disc 3. Input shaft 35 is mounted on tapered roller bearings 29A. Washer 33 bears on the inner race, and is held in place by bearing adjusting nut 34. The output shaft 28 is also mounted on tapered roller bearings 29B.

Figure 8:
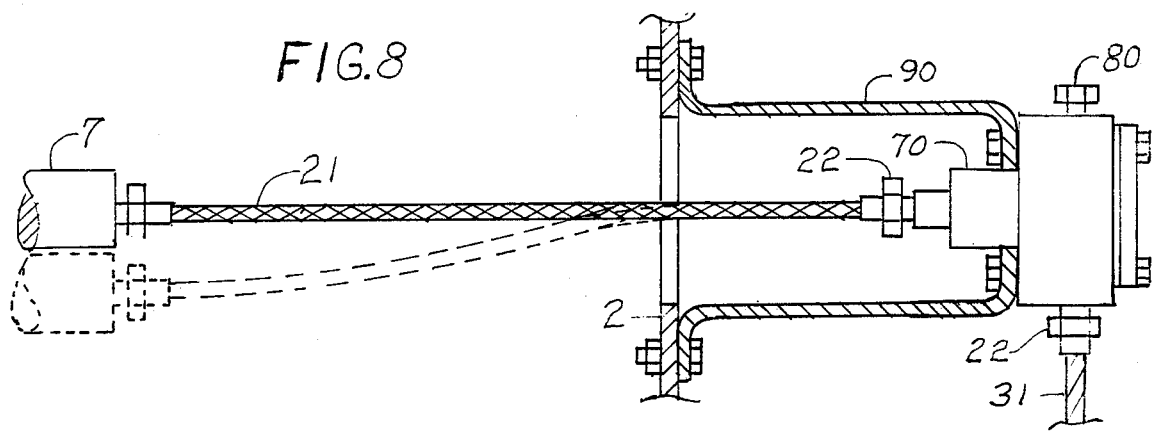
FIG.8 is a schematic side elevation of the rotating shaft seal assembly 70, attached to shaft seal mount 90, bolted to housing cover 2 of FIG. 2.

The mounting of hydraulic hose 21 is shown in FIG. 8. Rotating shaft seal assembly 70 is bolted to mount 90, and this assembly is fastened to housing cover 2 shown in FIG. 2. Dotted lines indicate position of crank pin 7 in its maximum extended position, and the approximate shape of hydraulic hose 21. When crank pin 7 is in the neutral position, hydraulic hose 21 is directly in line with the crank pin 7.

The speed reducer input to output ratio is controlled by the hydraulic pressure on piston 5. This pressure can be produced by several means, namely manually by pumping hydraulic fluid into the end of crank pin 7 fitted with a check valve to retain the fluid. Or by using another manual means shown in FIG. 9, except for using a manually operated release valve instead of the brake actuated release valve, intended for use on the transmission version. In addition another system of controls similar to FIG. 10 could be used with inputs to the pressure regulating valve appropriate for the job to be done.

Figure 3:
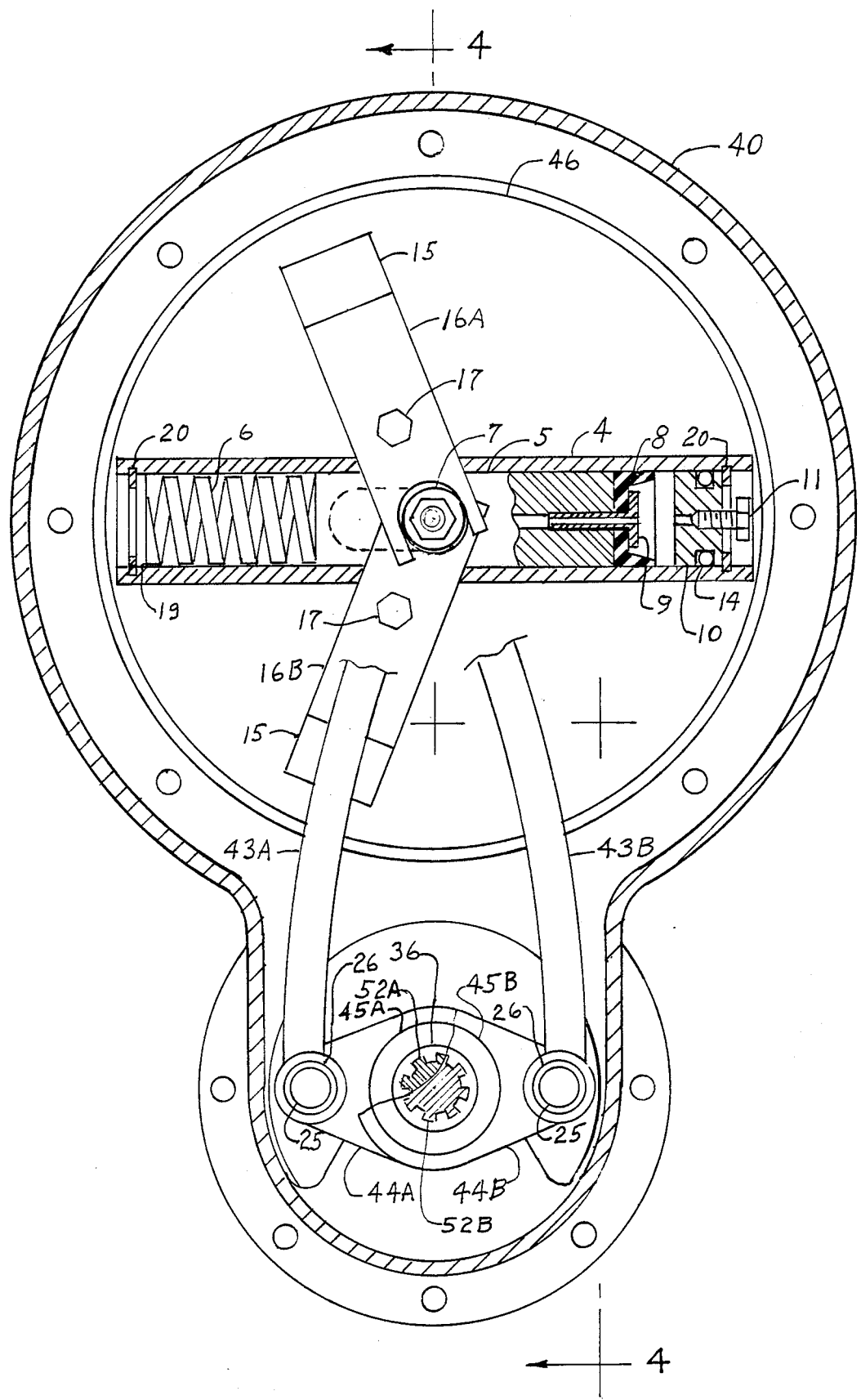
FIG. 3 is a front view of the variable speed transmission generally taken along line 3—3 of FIG. 4, with cross sections of the output shafts and hydraulic control mechanisms.
Figure 4:
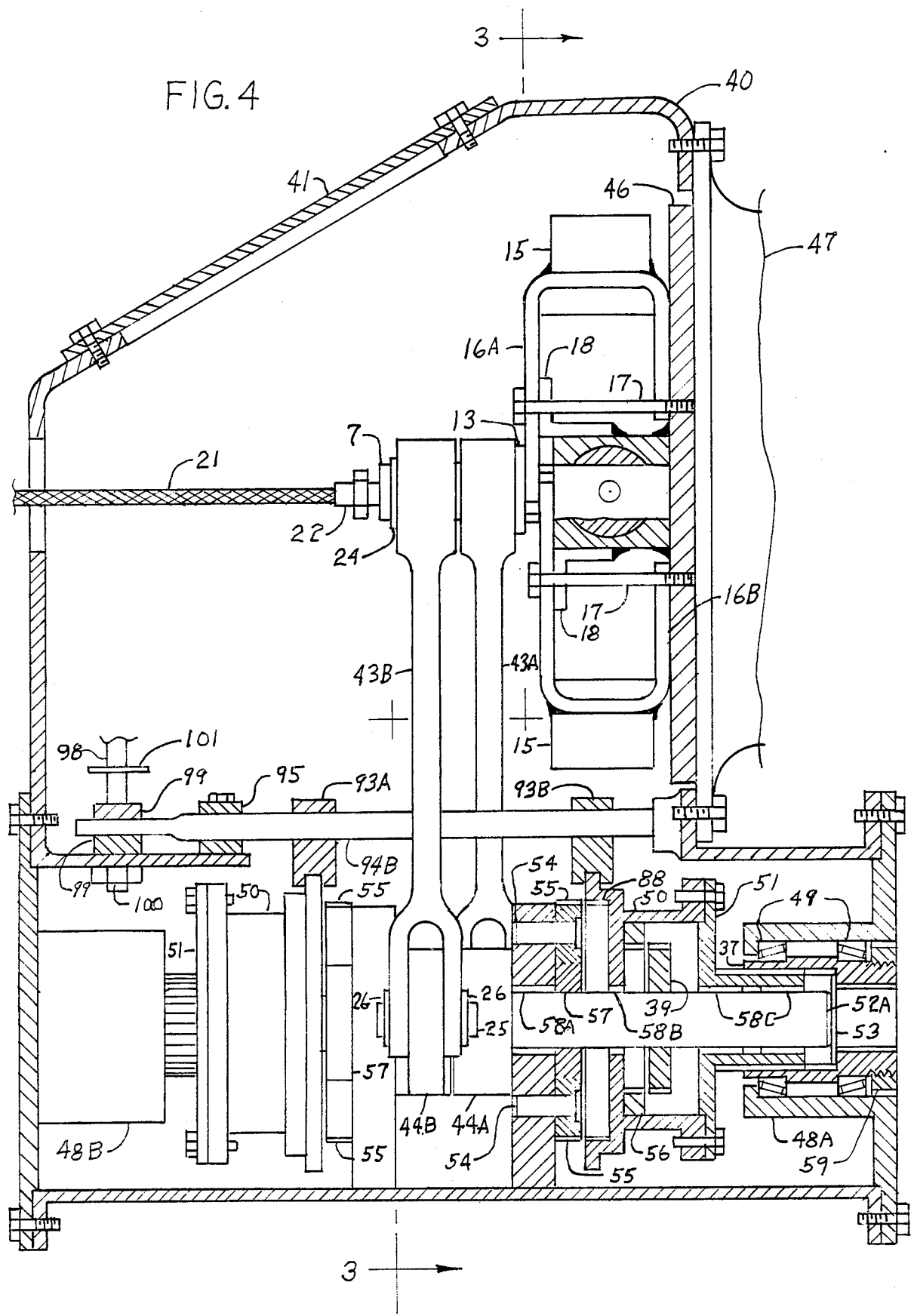
FIG. 4 is a cross sectional view taken generally along line 4—4 of FIG. 3, showing reversing and shifting mechanisms.
Figure 5:
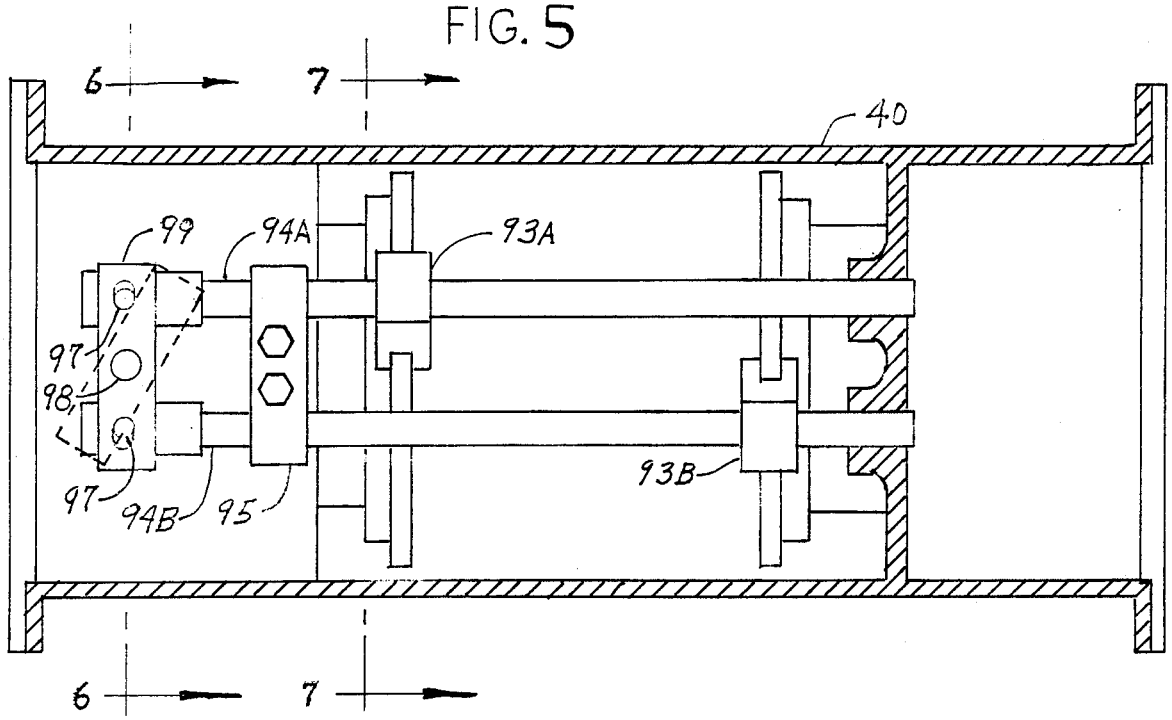
FIG. 5 is a top view of the mechanism used to shift from neutral to forward, or neutral to reverse.

FIG. 3 and 4 show an application designed for a continuously variable transmission for a front wheel drive automobile. It is basically the same mechanism as shown in FIG. 1 and 2, except that it has two output shafts, means for reversing the output shafts, and more sophisticated mechanism for controlling the hydraulic pressure, which controls the input to output ratios, and thereby indirectly the road speed of the vehicle.

Housing 40 shown in FIG. 3 is designed to be mounted on the rear of a transverse engine block. Hydraulic cylinder 4 is welded directly on the rear face of the engine flywheel 46, with crank pin 7 precisely in line with the engine main bearings when the hydraulic pressure is zero.

All the hydraulic parts are located the same as shown in FIG. 1. Also the counter balancing mechanism is the same as shown in FIG. 1. Connecting rods 43A and 43B are mounted on crank pin 7, and connected to rocker arms 44A and 44B, with rocker arm pins 25, and secured with retaining rings 26. Rocker arm assemblies 44A and 44B comprise of internally splined tubes 36 press fitted into over running clutches 45A and 45B, which are then press fitted into the bores of the rocker arms.

FIG. 4 is a sectional view 4—4 of FIG. 3. It shows reversing gears 55 being supported by shafts 54 that are press fitted into holes machined through casting wall. Output shaft assembly 52A, consists of a shaft that has been splined on one end to fit into internally splined tube 36. Output shaft gear 57 is press fitted and keyed to this shaft in the position shown in FIG. 4. Shift carriage 50, with internal splined ring 56 pressed in place, is then put on the shaft as shown in FIG. 4. Next externally splined disc 39 is press fitted and keyed to the output shaft 52A, where shown in FIG. 4. Finally shift carriage end plate 51 is bolted to carriage 50. The splined end of this complete assembly is then inserted through bronze bushing 58A, and into the splined opening in rocker arm assembly 44A. Outer bearing mount assembly 48A is then bolted to the housing 40.

The tube extending from shift carriage end plate 51 is externally splined to fit into the internal splines of the inner race mount 37. Beyond washer 53, the smaller bore of the inner race mount 37, is splined to receive the externally splined part of a constant velocity joint, namely the output drive.

FIG. 4 shows the shift mechanism in the neutral position. When shift carriage 50 is moved to the right internally splined ring 56 meshes with the externally splined disc 39, which is keyed to output shaft 52A. Shift carriage 50 is thus locked to the output shaft 52A, and transmits its rotation through its splined end to inner race mount 37 to final splines that receive the constant velocity joint splined end. This drives the vehicle forward.

Reverse is obtained by moving the shift carriage 50 left through the neutral position to the extreme left position. Internal tooth gear 88 then meshes with reversing gears 55. Output shaft gear 57 rotates, and drives the reversing gears 55, which then drives the internal tooth gear 88 that is secured to the shift carriage 50, which drives the inner race mount 37, but drives same in the opposite direction, namely moving the vehicle backwards.

Shifting forks 93A and 93B are secured to their respective shifting fork rods 94A and 94B. The shift mechanism is shown in greater detail FIGG. 5, 6, and 7. FIG., 5 is a top view of the shift mechanism, showing the shift rods 94A and 94B, and shift forks 93A and 93B in the neutral position, shift plates 99 being perpendicular to the shift rods 94A and 94B. The shift plates 99 are welded to pivot shaft 98. When the pivot shaft is rotated about 35 degrees clockwise as shown by the dotted lines, both the output shafts will be in reverse drive. If the pivot shaft is rotated about 35 degrees counter clockwise from the neutral position both the output shafts will be in forward drive. Rod guide 95 holds the shift rods in alignment. Shift rods 94A and 94B are flattened in the area between the shift plates 99 to keep the rods from rotating. Shift forks 93A and 93B are pinned to shift rods 94A and 94B at the proper location and angle as shown.

Figure 6:
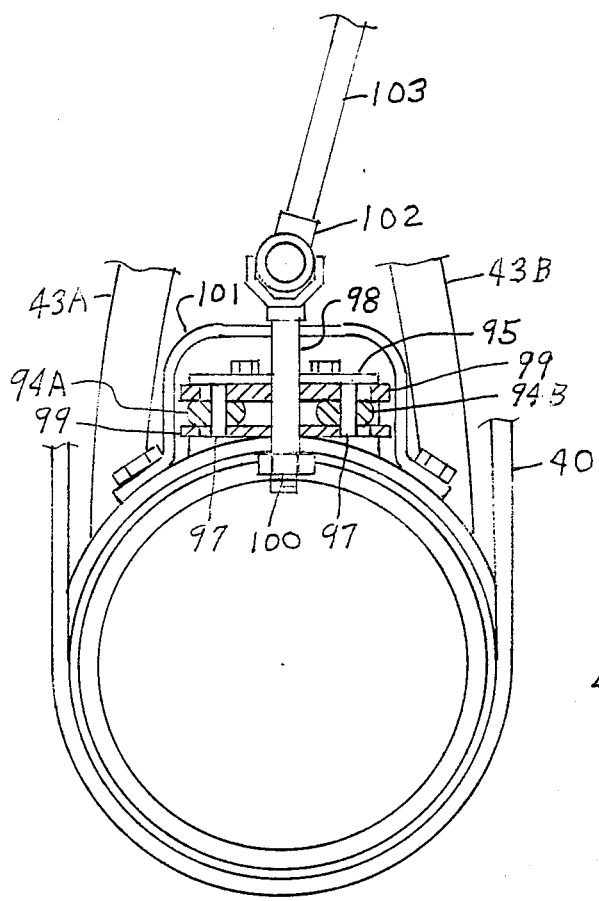
FIG. 6 is an end view of the shifting mechanism, section 6—6 of FIG. 5.
Figure 7:
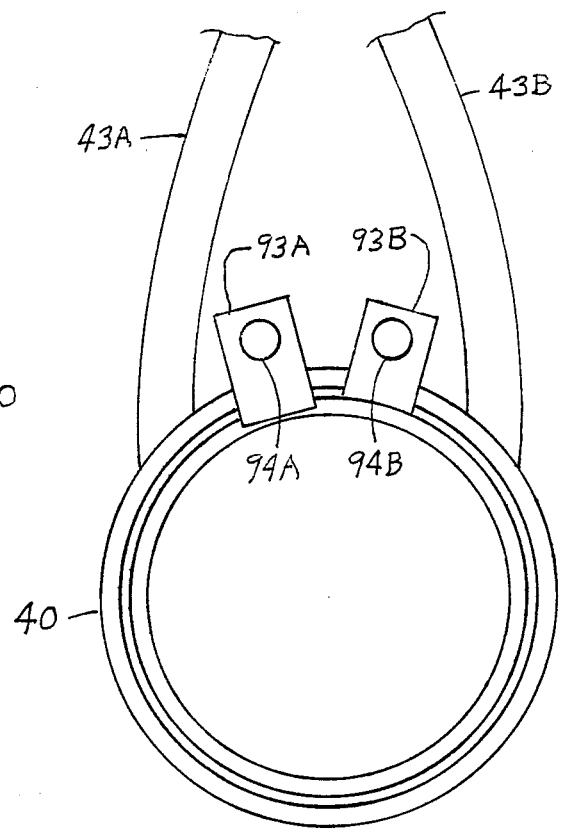
FIG. 7 is an end view of the shift mechanism, along line 7—7 of FIG. 5.

FIG. 6 is an end view of the shift mechanism. Roll pins 97 are driven into holes in the flattened end of the shift rods, through slots in the shift plates 99. Pivot shaft 98 is restrained from moving upwardly too far by a self locking nut 100. Pivot shaft brace 101 keeps upper part of pivot shaft from moving too far. Universal joint 102 is fastened to top end of pivot shaft 98, with extension shaft 103 fastened to the other side of the universal joint. This is needed to bring shaft 103 out the top of the housing 40, clear of hydraulic hose 21 where a handle can be installed on shaft 103 at 90 degrees thereto, for shifting purposes.

The same hydraulic configuration shown in FIG. 8, used on the speed reducer, can be used for the variable speed transmission, by using a shorter rotating shaft seal mount 90, and fastening the assembly to housing 40.

Figure 9:
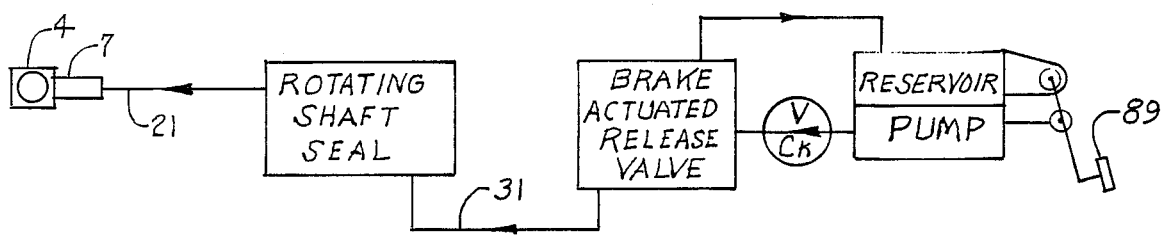
FIG. 9 is a schematic of a manual version of controlling pressure in the hydraulic system by a foot pressure pump.

FIG. 9 shows a "manual" type of hydraulic control for the variable speed transmission with a reservoir and pump similar to the hydraulic brake system on automobiles. When the pedal is pumped it delivers hydraulic fluid to space above piston 5 and finally applies pressure to same, moving crank pin 7 to start connecting rods moving up and down, actuating the over running clutches, which grip the output shafts. The brake actuated release valve allows hydraulic fluid to return to the reservoir as soon as brake pedal is moved a short distance. This eliminates braking against the motor. A check valve prevents hydraulic fluid from returning to reservoir when hydraulic pump pedal is released. If a lower hydraulic pressure is desired a light tap on the brake pedal will release a little pressure. If too much, pressure can be readjusted by pressing pedal 89.

Figure 10:
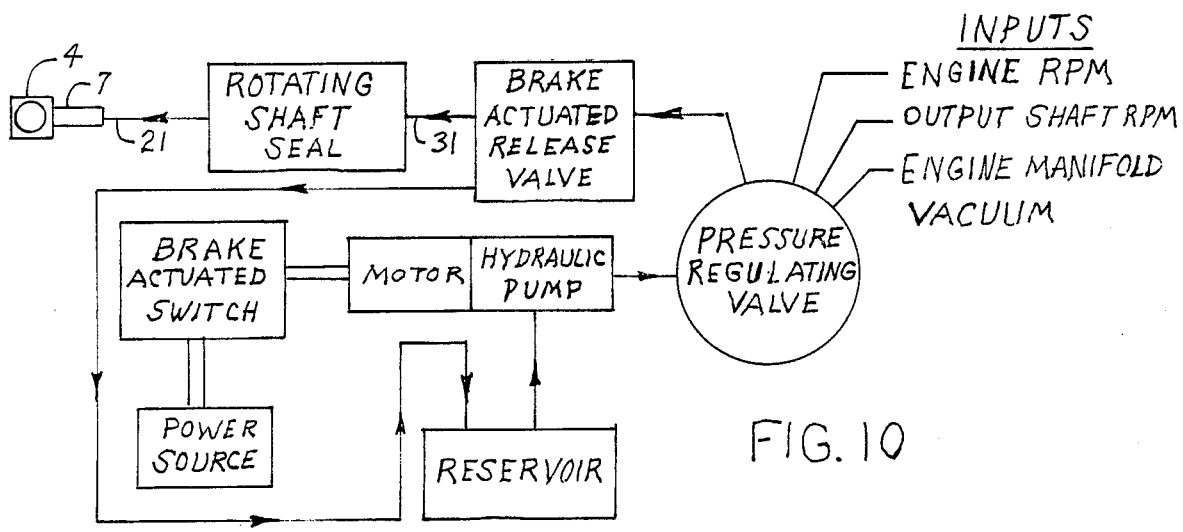
FIG. 10 is a schematic of an automatically controlled hydraulic pressure system, having a pressure regulating valve.

FIG. 10 shows an automatic type of hydraulic control for the variable speed transmission. Current for the motor flows from the power source, through a brake actuated switch, which is normally closed, to the motor that drives the hydraulic pump. Fluid from the pump goes into the regulating valve which is modulated by inputs from the engines speed, the output shaft speed, the engine manifold vacuum, and possibly other inputs to regulate the hydraulic pressure, and thus the ratio of engine speed to axle speed for optimum operation of the engine. This schematic includes a brake actuated release valve, as well as a brake actuated electric switch.

The variable speed transmission has separate output shafts namely 52A and 52B, one for each front wheel, and are torqued by over running clutches 45A and 45B once each for every revolution of the engine. The over running clutches permit either front wheel to turn faster than the other one. This allows the wheel on the outer radius of a turn to travel further than the wheel on the inner radius. This capability permits the elimination of the differential, and permits free wheeling when the enging speed is reduced below what is needed to propel the vehicle. Both the speed reducer and the transmission have output ratios from infinity to one, to two to one.

The above description shall not be construed as limiting the ways in which this invention may be practiced but shall be inclusive of many other variations that do not depart from the broad interest and intent of the invention.

I claim:

1. A rotary speed reducer with continuously variable output comprising: a housing including an input shaft therein disposed in driving engagement with a mounting disc fitted with a movable crank pin, two connecting rods mounted thereon and connected to the outer end of two rocker arm assemblies, each rocker arm assembly comprising an overrunning clutch secured between the bore thereof and an output shaft; an assembly comprising a cylinder, and a piston movably mounted within said cylinder, a slot means formed in said cylinder for receiving said crank pin therethrough and a hole means formed in said piston for connecting said crank pin to said piston, the above assembly secured to said mounting disc with the crank pin aligned with the center of rotation of the input shaft, a return spring placed in said cylinder and secured in biasing engagement with said piston, a hydraulic cup seal secured to the piston; a pair of counterweights secured to the ends of counter balance levers pivotally mounted on said mounting disc, ends of said counter balance levers engaging the crank pin; and a hydraulic system for controlling the position of the crank pin, said hydraulic system comprising a pump and reservoir, a check valve connecting said pump to a pressure release valve, said pressure release valve being connected to a rotating shaft seal mounted on said housing, and a conduit structure connecting said cylinder to said rotating shaft seal, whereby hydraulic fluid may be supplied to the cylinder to change the position of said crank pin.

2. A rotary speed reducer as in claim 1 further comprising a retaining ring and retainer secured along with said hydraulic cup seal to the end of said piston with a fluid seal plug O-ring and retaining ring installed in the end of said cylinder.

3. A rotary speed reducer as in claim 1 further comprising said counter balance levers including forked ends engaging said crank pin.

4. A rotary speed reducer as in claim 1 wherein said slot means comprises two elongated slots integrally formed in said cylinder in directly opposite relation to each other on opposite sides of said cylinder, said slots disposed in communicating relation with said hole means formed in said piston.

5. A rotary speed reducer as in claim 4 wherein said hole means comprises a cross hole integrally formed in and extending through said piston, said cross hole disposed in aligned relation to said two slots, said crank pin passing through said slot into engagement with said piston by means of said cross hole.

6. A continuouously variable transmission for driving lever output shafts having a housing and provided therein with a driven engine flywheel, fitted with a movable crank pin, with two connecting rods mounted thereon, and connected to the outer ends of two rocker arm assemblies, each rocker arm assembly comprising an overrunning clutch secured to a bore thereof, and one of the overrunning clutches secured to one of the output shafts, the other overrunning clutch secured to another of the output shafts; an assembly comprising a cylinder with a pair of lengthwise slots directly opposite each other, a piston made for a sliding fit through said cylinder, and with a cross hole to receive a crank pin for securement thereto when the crank pin is inserted through said slots, the above assembly secured to said flywheel with the crank pin in alignment with the center of rotation of the driven engine flywheel, a return spring placed in said cylinder and secured at one end thereof, a hydraulic cup seal and retainer secured to an end of said piston, with a fluid seal plug, O-ring, and retainer ring installed in the other end of said cylinder; a pair of counterweights secured to ends of two counter balance levers, pivotally mounted on said flywheel, ends of said counter balance lever engaging the crank pin; a hydraulic system comprising a power source, a brake actuated switch connecting said power source to a motor driving a hydraulic pump, a reservoir connected to said pump, a pressure regulating valve, controlled by input from the engine speed, output shaft speed, and engine manifold vacuum, said pressure regulating valve being connected to a brake actuated release valve, said brake actuated release valve being connected to a rotating shaft seal mounted on the housing, and a flexible hydraulic base connected to said rotating shaft seal whereby hydraulic fluid may be supplied to the cylinder to change the position of said crank pin; and a reversing mechanism for changing the direction of rotation of said output shafts, said reversing mechanism comprising a forward gear combination, a reverse gear combination, and a shift carriage for each of said output shafts, and a shift linkage for simultaneously moving said shift carriages into a forward position wherein said shift carriages engage said forward gear combination with said output shafts, a reverse gear position wherein said shift carriages engages said reverse gear combinations with said output shafts, and a neutral position wherein neither of said gear combinations engage with said output shafts.

* * * * *